United States Patent
Ferries et al.

(10) Patent No.: US 8,712,805 B1
(45) Date of Patent: Apr. 29, 2014

(54) METHOD AND SYSTEM FOR PROVIDING GEOHAZARD INFORMATION TO CUSTOMERS

(75) Inventors: John Robert Thomas Ferries, Boerne, TX (US); John Chandler Hopkins, III, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 305 days.

(21) Appl. No.: 12/910,159

(22) Filed: Oct. 22, 2010

Related U.S. Application Data (60) Provisional application No. 61/319,740, filed on Mar. 31, 2010.

(51) Int. Cl.
*G06Q 40/00* (2012.01)
*G06Q 40/08* (2012.01)

(52) U.S. Cl.
CPC ............................... *G06Q 40/08* (2013.01)
USPC .............. 705/4; 702/5; 707/102; 382/106; 382/113

(58) Field of Classification Search
USPC ............... 705/4; 702/5, 2; 382/106, 113, 175; 340/604; 707/102
See application file for complete search history.

(56) References Cited

U.S. PATENT DOCUMENTS

| | | | |
|---|---|---|---|
| 7,395,157 B2 | 7/2008 | Feyen et al. | |
| 7,917,292 B1 * | 3/2011 | Du | 702/5 |
| 8,077,927 B1 * | 12/2011 | Maltby, II | 382/113 |
| 2002/0147613 A1 * | 10/2002 | Kennard et al. | 705/1 |
| 2004/0186753 A1 | 9/2004 | Kim et al. | |
| 2004/0230460 A1 * | 11/2004 | Thomas et al. | 705/4 |
| 2005/0075911 A1 * | 4/2005 | Craven, Jr. | 705/4 |
| 2005/0086084 A1 | 4/2005 | Dillard | |
| 2005/0144114 A1 | 6/2005 | Ruggieri et al. | |
| 2006/0100912 A1 | 5/2006 | Kumar et al. | |
| 2006/0265350 A1 | 11/2006 | Klein | |
| 2008/0055096 A1 * | 3/2008 | Aylward | 340/601 |
| 2008/0243678 A1 * | 10/2008 | Hooley et al. | 705/38 |
| 2008/0306982 A1 * | 12/2008 | Moudy | 707/102 |
| 2009/0055227 A1 | 2/2009 | Bakos | |
| 2009/0089221 A1 * | 4/2009 | Ehrhart | 705/36 R |
| 2009/0259581 A1 | 10/2009 | Horowitz et al. | |

OTHER PUBLICATIONS

Brabb et al., "Possible Costs Associated with Investigating and Mitigating Some Geologic Hazards in Rural Parts of San Mateo County, California," U.S. Geological Survey Open-File <http://geopubs.wr.usgs.gov/open-file/of00-127/of00-127_2.pdf>.

(Continued)

*Primary Examiner* — Tien Nguyen
(74) *Attorney, Agent, or Firm* — Kilpatrick Townsend & Stockton LLP (57) ABSTRACT

A method of displaying geohazard information to a user includes providing a computer having a processor and receiving a search query from the user. The method also includes accessing, using the processor, a real estate database, determining, using the processor, a plurality of homes in the real estate database matching the search query, and displaying information related to the plurality of homes to the user. The method further includes accessing, using the processor, a geohazard database, determining, using the processor, one or more geohazards for one or more of the plurality of homes, and displaying information related to the one or more geohazards to the user.

20 Claims, 8 Drawing Sheets

(56) References Cited

OTHER PUBLICATIONS

Hobbs et al., "Improved modelling and communication of urban risks: Case studies from the United Kingdom and South-East Asia," European econference of the International Association for Engineering geology, Madrid, Spain, Sep. 15-20, 2008; retrieved: <http://nora.nerc.ac.uk/4995/1/HOBIMA.pdf>.

Hwang, "Environmental amenities and disamenities, and housing prices; using GIS techniques," A Dissertation, Texas A&M University, Aug. 2003; retrieved from the Internet: <http://etd.tamu.edu/bitstream/handle/1969.1/195/HWANG-DISSERTATION.pdf?sequence=1>, 234 pages total.

Pryce et al., "Flood Risk, Climate Change, Housing Economics, and the Four Fallacies of Extrapolation," Paper Presented at ISA Conference, Glasgow, Sep. 2009; retrieved from the Internet: <http://www.gla.ac.uk/media/media_129727_en.pdf>, 33 pages total.

* cited by examiner

METHOD AND SYSTEM FOR PROVIDING GEOHAZARD INFORMATION TO CUSTOMERS

CROSS-REFERENCES TO RELATED APPLICATIONS

This application claims priority to U.S. Provisional Patent Application No. 61/319,740, filed on Mar. 31, 2010, entitled "Method and System for Providing Geohazard Information to Customers," the disclosure of which is hereby incorporated by reference in its entirety for all purposes.

BACKGROUND OF THE INVENTION

Customers demand more of the products and services they use than ever before. They insist that the companies they deal with on a regular basis provide them greater and greater levels of accuracy and more tailored service offerings. Companies configure and operate ever increasing numbers of computer systems to achieve this. Using sources of information that have traditionally been unavailable when servicing these customers is now expected.

SUMMARY OF THE INVENTION

The present invention relates generally to insurance systems. More specifically, the present invention relates to methods and systems for providing information on geohazards to insurance customers. Merely by way of example, the invention has been applied to a method and system for providing information on a plurality of homes for sale including information on geohazards associated with one or more of the plurality of homes for sale. As another example, the invention has been applied to a method and system for checking insurability of a home based on geohazards associated with the home. The methods and techniques can be applied to a variety of insurance systems.

According to an embodiment of the present invention, a method of displaying geohazard information to a user is provided. The method includes providing a computer having a processor and receiving a search query from the user. The method also includes accessing, using the processor, a real estate database, determining, using the processor, a plurality of homes in the real estate database matching the search query, and displaying information related to the plurality of homes to the user. The method further includes accessing, using the processor, a geohazard database, determining, using the processor, one or more geohazards for one or more of the plurality of homes, and displaying information related to the one or more geohazards to the user.

According to another embodiment of the present invention, a method of informing a user of an insurability status based on geohazards is provided. The method includes providing a computer having a processor and receiving an address from the user. A property is associated with the address. The method also includes accessing a geohazard database, determining, using the processor, one or more geohazards associated with the property, and determining, using the processor, if the property is insurable. If the property is insurable, the method includes accessing an insurance database, computing, using the processor, a baseline premium for the property, computing, using the processor, an additional premium based on the one or more geohazards, and displaying an insurance premium for the property. The insurance premium includes the baseline premium and the additional premium. If the property is uninsurable, the method includes notifying the user that the property is uninsurable, and in some embodiments, why the property is uninsurable.

According to a specific embodiment of the present invention, a computer-readable storage medium comprising computer-readable instructions tangibly embodied on the computer-readable storage medium, which, when executed by a data processor, displays geohazard information to a user is provided. The plurality of instructions include instructions that cause the data processor to receive a search query from the user and instructions that cause the data processor to access a real estate database. The plurality of instructions also include instructions that cause the data processor to determine a plurality of homes in the real estate database matching the search query and instructions that cause the data processor to display information related to the plurality of homes to the user. The plurality of instructions further include instructions that cause the data processor to access a geohazard database, instructions that cause the data processor to determine one or more geohazards for one or more of the plurality of homes, and instructions that cause the data processor to display information related to the one or more geohazards to the user.

According to a particular embodiment of the present invention, a computer-readable storage medium comprising computer-readable instructions tangibly embodied on the computer-readable storage medium, which, when executed by a data processor, informs a user of an insurability status based on geohazards (e.g., location in a flood plain or location in a brush fire zone) is provided. The plurality of instructions include instructions that cause the data processor to receive an address from the user. A property is associated with the address. The plurality of instructions also include instructions that cause the data processor to access a geohazard database, instructions that cause the data processor to determine one or more geohazards associated with the property, and instructions that cause the data processor to determine if the property is insurable. If the property is insurable, the plurality of instructions include instructions that cause the data processor to access an insurance database, instructions that cause the data processor to compute a baseline premium for the property, instructions that cause the data processor to compute an additional premium based on the one or more geohazards, and instructions that cause the data processor to display an insurance premium for the property. The insurance premium includes the baseline premium and the additional premium. If the property is uninsurable, the plurality of instructions include instructions that cause the data processor to notify the user that the property is uninsurable.

According to an alternative embodiment of the present invention, a method of displaying real estate and geohazard information is provided. The method includes providing a computer having a processor, obtaining a listing of homes for sale, displaying a map of a geographic area including the homes for sale, and displaying a plurality of markers on the map. Each of the plurality of markers is associated with one of the homes for sale. The method also includes receiving a selection of a home from among the homes for sale and accessing, using the processor, a geohazards database (e.g., a proprietary geohazard database). The method further includes determining, using the processor, one or more geohazards for the selected home and displaying information related to the selected home and information related to the one or more geohazards for the selected home. The information related to the one or more geohazards can include an icon representing a geohazard and a description of the geohazard.

According to an embodiment, obtaining a listing of homes for sale includes receiving a search query from a user, accessing, using the processor, a real estate database including information related to homes, and determining, using the processor, the listing of homes for sale based on a comparison between the information related to the homes and the search query. In one implementation, the method additionally includes computing, using the processor, an insurability score for the selected home and displaying the insurability score. The insurability score can include a numeric value associated with a range of numeric values.

According to another alternative embodiment of the present invention, a graphical user interface operable to display real estate information in conjunction with geohazards information is provided. The graphical user interface includes a map region operable to display a map of a geographic area and a plurality of markers disposed on the map. Each of the plurality of markers is associated with a home for sale. The graphical user interface also includes a home detail region adjacent to the map region and operable to display first information related to a home selected from among the homes for sale and a home summary region overlaid on the map region. The first information can include first marketing information and first geohazard information related to the selected home. The home summary region is operable to display second information related to the selected home. The second information can include second marketing information and second geohazard information related to the selected home. At least one of the home detail region or the home summary region are operable to display geohazard information related to the selected home.

In one embodiment, the second marketing information is different from the first marketing information and the second geohazard information is different from the first geohazard information. In another embodiment, at least one of the first geohazard information or the second geohazard information includes an icon and a description related to a particular geohazard. Additionally, at least one of the first geohazard information or the second geohazard information can include an insurability score for the selected home.

Numerous benefits are achieved by way of the present invention over conventional techniques. For example, embodiments of the present invention provide customers with visibility into geohazards associated with a given property. Information on geohazards can be provided at an early stage of the home search process, enabling a home buyer to limit the search to insurable properties of interest. Moreover, embodiments of the present invention provide a "Check Insurability" function based on geohazards not available using conventional techniques. These and other embodiments of the invention along with many of its advantages and features are described in more detail in conjunction with the text below and attached figures.

DETAILED DESCRIPTION OF SPECIFIC EMBODIMENTS

Embodiments of the present invention relate to technologies to facilitate homeowners and/or renters in finding, acquiring, insuring, and/or maintaining real property. Technologies related to embodiments of the present invention support a homeowner/renter, for example, a member of the present assignee, with the initial preparation associated with the purchase of a home and/or rental of a home/apartment. Such initial preparation can include advice and counseling related to a person's ability to afford a home or apartment, development of a financial plan to facilitate the acquisition, web-enabled self-service systems (e.g., home purchase calculators) used to determine financial goals and requirements, and/or on-line member communities related to homeownership and/or rental.

After a person completes initial preparation, technologies related to embodiments of the present invention assist the person in finding suitable properties through the use of rent/buy listings including information tailored to each person's interests and background. For example, preapproval of the person for mortgage rates and/or homeowner's/renter's insurance can be used to provide rich information content as part of the search process. On-line member communities can be used to assist users in finding property that is suitable for the particular user's interests and income.

Additionally, technologies related to embodiments of the present invention provide for assistance in the purchase/rental transaction, including obtaining a mortgage and provision of assistance in negotiating the purchase or lease. Protection of the newly acquired home or rented property is also related to embodiments of the present invention, in one of several forms including homeowner's insurance, mortgage life insurance, renter's insurance, flood insurance, personal property insurance, home security systems, home warranties, and the like.

Moreover, technologies related to embodiments of the present invention provide a person with assistance in moving to, maintaining and/or renovating, and/or refinancing the newly purchased or rented property. Thus, embodiments of the present invention relate to technologies that provide a one-stop home resource for delivering home solutions related to buying, selling, renting, and/or owning real property. In particular embodiments, members of a membership organization (e.g., the present assignee) utilize the methods and systems described herein to manage their real property interests and interact with other community members to enable new concepts related to homes and other real property.

A geohazard can be defined as a geological state that represents or has the potential to develop further into a situation leading to damage or uncontrolled risk or hazard. Examples of geohazards, without limitation, are sinkholes, landslide areas, mudslide areas, earthquake fault lines, flood plains, tidal wave zones, erosion, subsidence zones, volcanic eruptions, other geological states that pose risks to homes and businesses, or the like. Because geohazards are related to geological and environmental conditions that can impact real property, insurance policies for real property account for geohazards. Typically, the insurance consumer is not aware of the additional premium resulting from any geohazards affecting the property that is insured. Moreover, the consumer may not become aware of the fact that a property is not insurable due to the presence of a geohazard until the consumer has invested a significant amount of time and energy in finding the property.

Figure 1:
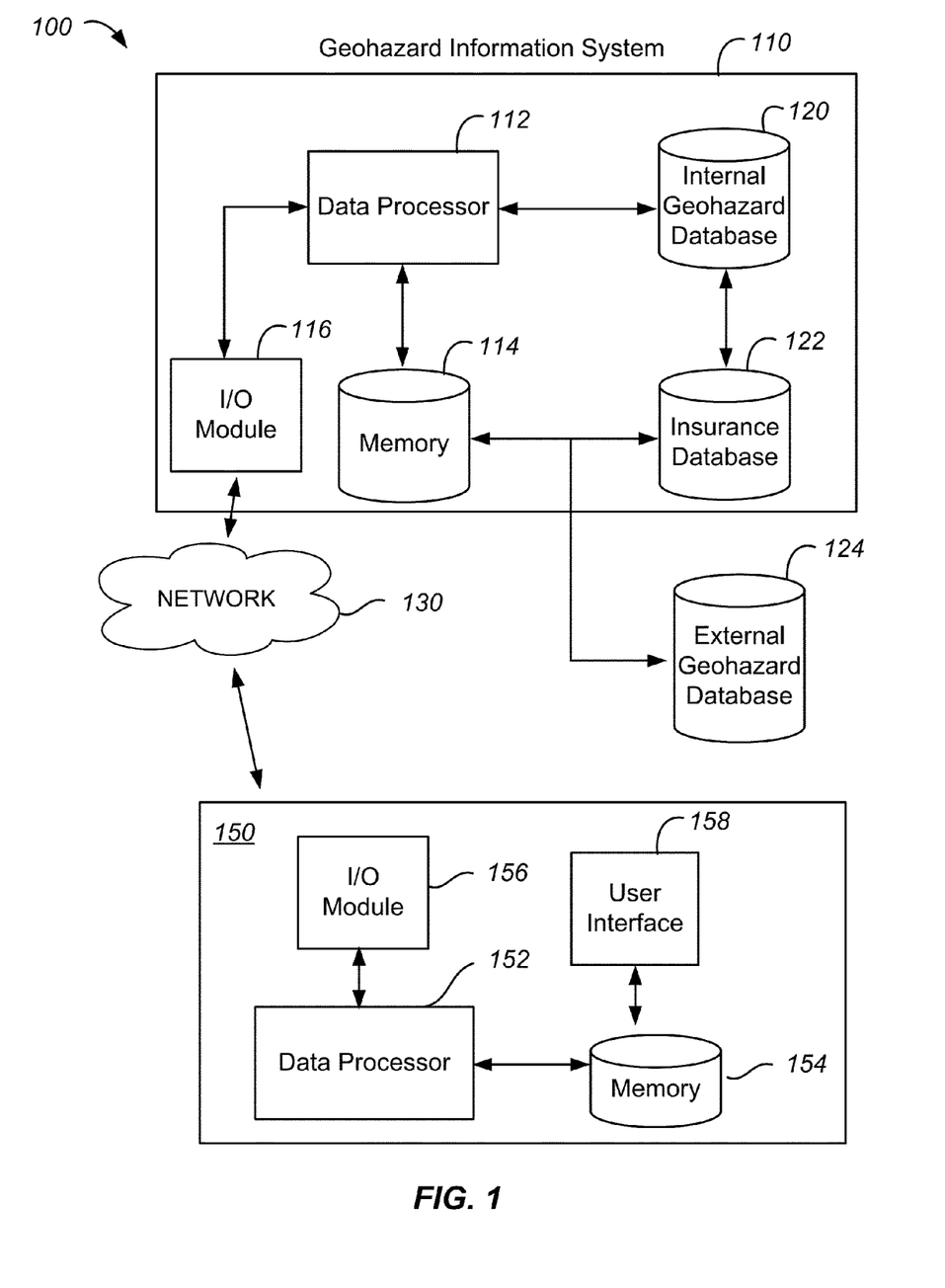
FIG. 1 is a high level schematic diagram illustrating a geohazard information system according to an embodiment of the present invention.
Figure 6:
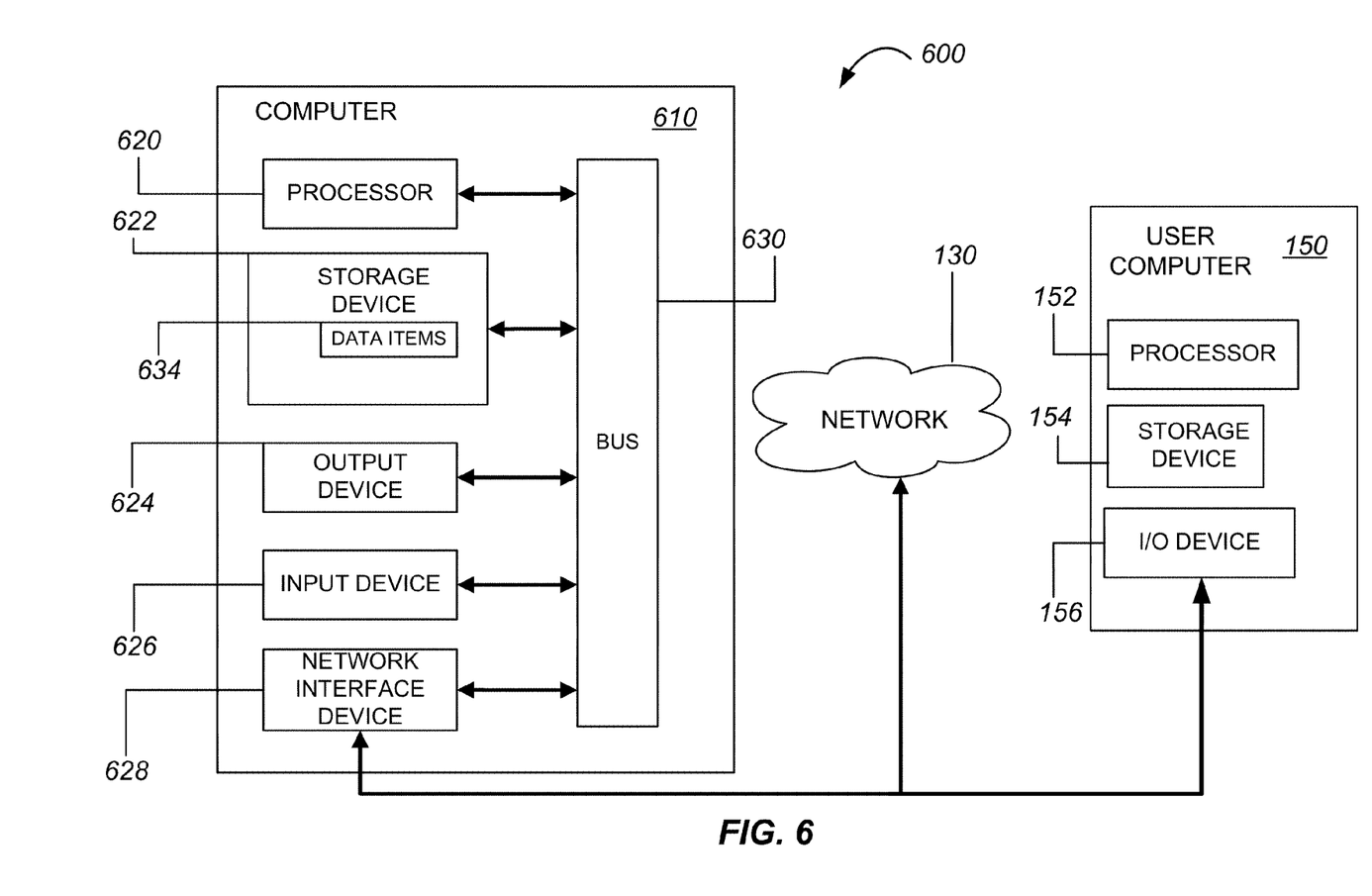
FIG. 6 is high level schematic diagram illustrating a computer system including instructions to perform any one or more of the methodologies described herein.

FIG. 1 is a high level schematic diagram illustrating a geohazard information system according to an embodiment of the present invention. As illustrated in FIG. 1, a user operating user computer 150 interacts with the geohazard information system 110 through network 130. User computer 150 can include one of many types of computing devices including, without limitation, a personal computer, a laptop computer, a notebook computer, a tablet computer, a handheld mobile device, a PDA, a mobile phone, or the like. The geohazard information system 110 includes a data processor 112, also referred to as a processor, and a memory 114. The description provided in relation to processors and memory in FIG. 6 is also applicable to the data processor 112 and memory 114. An input/output module 116 is provided to enable communication with the geohazard information system by external users and computers.

The geohazard information system 110 also includes an internal geohazard database 120, external geohazard database 124, and an insurance database 122. The geohazard information system 110 is communicatively coupled, in one example, to an external geohazard database. The internal geohazard database 120, in contrast with the external geohazard database 124, is maintained by the company operating the geohazard information system 110, typically an insurance company. As described more fully throughout the present specification, the I/O module 116, the data processor 112, memory 114, internal geohazard database 120, and insurance database 122 are utilized to receive inputs from a user operating user computer 150 and determine the insurability of a property in view of the geohazards associated with the property. In addition to basing insurance rates, in part, on the geohazards associated with the property, information on the geohazards can be provided to the user in order to enable the user to make an informed decision during a property search process.

Although an external geohazard database 124 is illustrated in FIG. 1, this is not required by embodiments of the present invention. In some embodiments, geohazard data is maintained internally within the geohazard information system. Preferably, data from both internal and external sources is integrated to provide the system operator with data that is both useful and low in cost.

A user operating user computer 150 interacts with the geohazard information system 100 through network 130, which may be the Internet. In some embodiments, the network 130 is partly or wholly a private wide area network, local area network, or the like. In an embodiment described in additional detail below, a user can enter an address or a search query using user interface 158, which results in data transfer through I/O module 156 and network 130. The information from the user, for example, an address, can be used by the geohazard information system 110 to determine one or more geohazards associated with the address, the insurability of the property associated with the address, and/or an insurance rate associated with the address. The user computer 150 can receive responses and information from the geohazard information system 110, process the received information using data processor 152, store the received and/or processed information using memory 154, and display the processed/stored information using the user interface 158. As an example, a customer of an insurance company (e.g., a member of the present assignee) can use the user computer 150 to interact with an insurance company (e.g., the present assignee) through the Internet, providing and receiving information through web pages operated by the insurance company (e.g., the present assignee's website).

Figure 2:
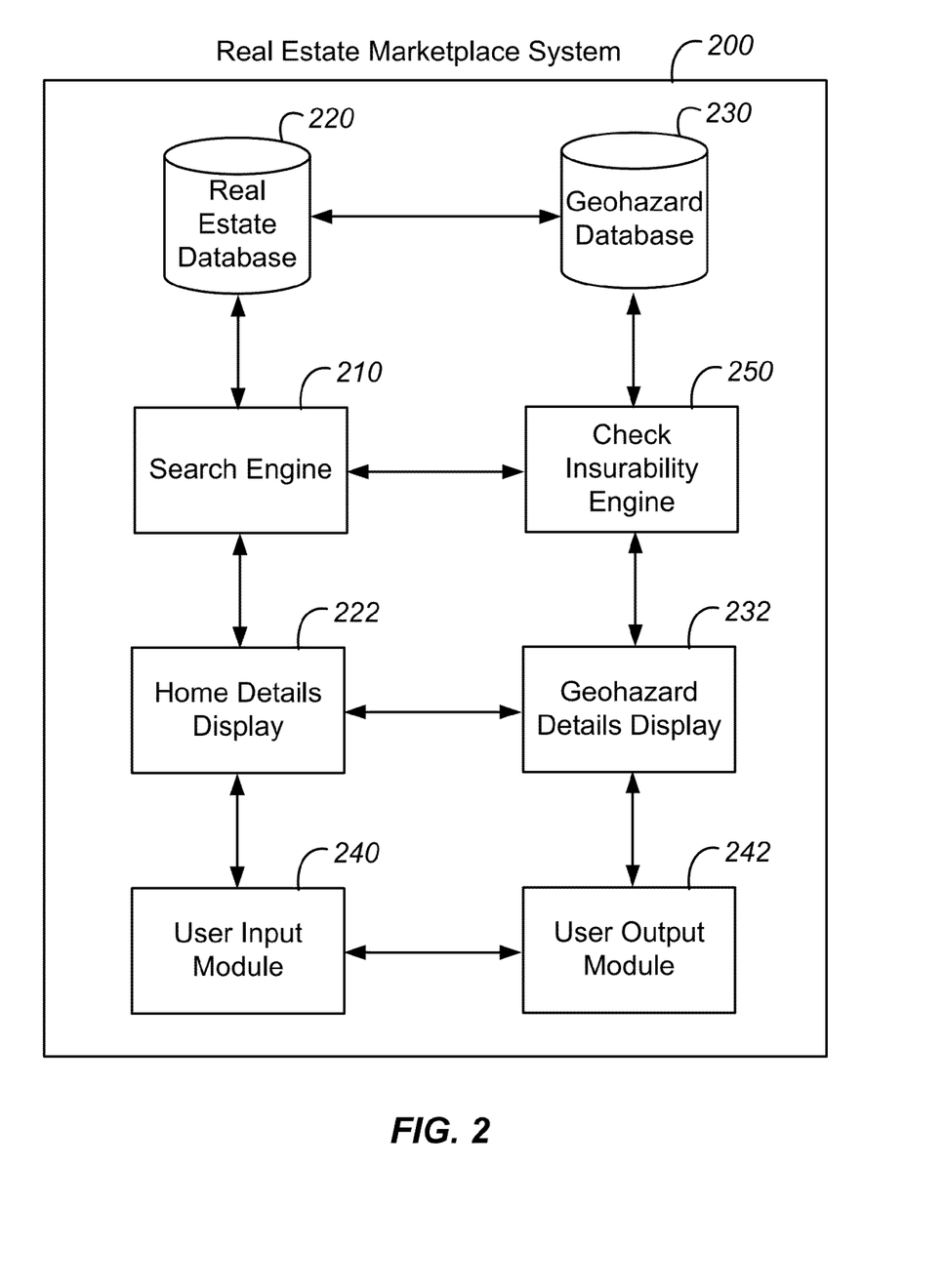
FIG. 2 is a high level schematic diagram illustrating a system for searching real estate listings and displaying geohazard information related to homes returned by the search according to an embodiment of the present invention.

FIG. 2 is a high level schematic diagram illustrating a system for searching real estate listings and displaying geohazard information related to homes returned by the search according to an embodiment of the present invention. As illustrated in FIG. 2, a real estate marketplace system 200 includes a user input module 240 and a user output module 242. In an embodiment, the user input and output is provided through one or more web pages accessed through the Internet.

The user is able to enter information used by the real estate marketplace system, for example, by the search engine 210. As described more fully in relation to FIG. 3 below, the search engine 210 receives search parameters from the user and accesses the real estate database 220 to determine properties matching the search parameters. Information on the properties (e.g., homes) matching the search parameters is presented to the user using the home details display 222. The home details display 222 can be a portion of a web page adapted to display information related to the home such as number of bedrooms, square footage, and the like.

Information used by the check insurability engine 250 may be provided by the user using the user input module 240 or may be provided as a result of the search performed by the search engine 210. As described in relation to FIG. 3, an identifier (e.g., an address) for one or more of the homes returned in the search will be provided to the check insurability engine 250 in order to determine the geohazards associated with the one or more homes. Information used by the check insurability engine 250 is included in the geohazards database 230. The geohazards associated with a home are displayed using the geohazard details display 232, which, like the home details display 222, can be a portion of the web page. In an embodiment, an area adjacent the home details display is used to display the geohazard details. Information related to the geohazards may also be output using the user output module, for example, in the form of a report, an email notification, information posted to a server, or the like.

In the embodiment illustrated in FIG. 2, the real estate marketplace system may provide a link or a separate display area for a check insurability function. In this example embodiment, once a home is returned by the search engine 210, a user has the option to check the insurability of the home, including a determination of the insurability based on geohazards associated with the home as well as additional premiums associated with the geohazards in the case that the home is insurable. Thus, embodiments of the present invention provide functionality not available using conventional home search systems, since in addition to the basic real estate information related to the home, the user is able to determine if the home is uninsurable on account of geohazards associated with the home. If the home is uninsurable, the user is able to obtain this information early in the search process, rather than late in the process when the user tries to obtain insurance. In addition to information that the home is uninsurable, the user could be provided with information on the geohazards and an additional insurance expense resulting from the geohazards.

Figure 3:
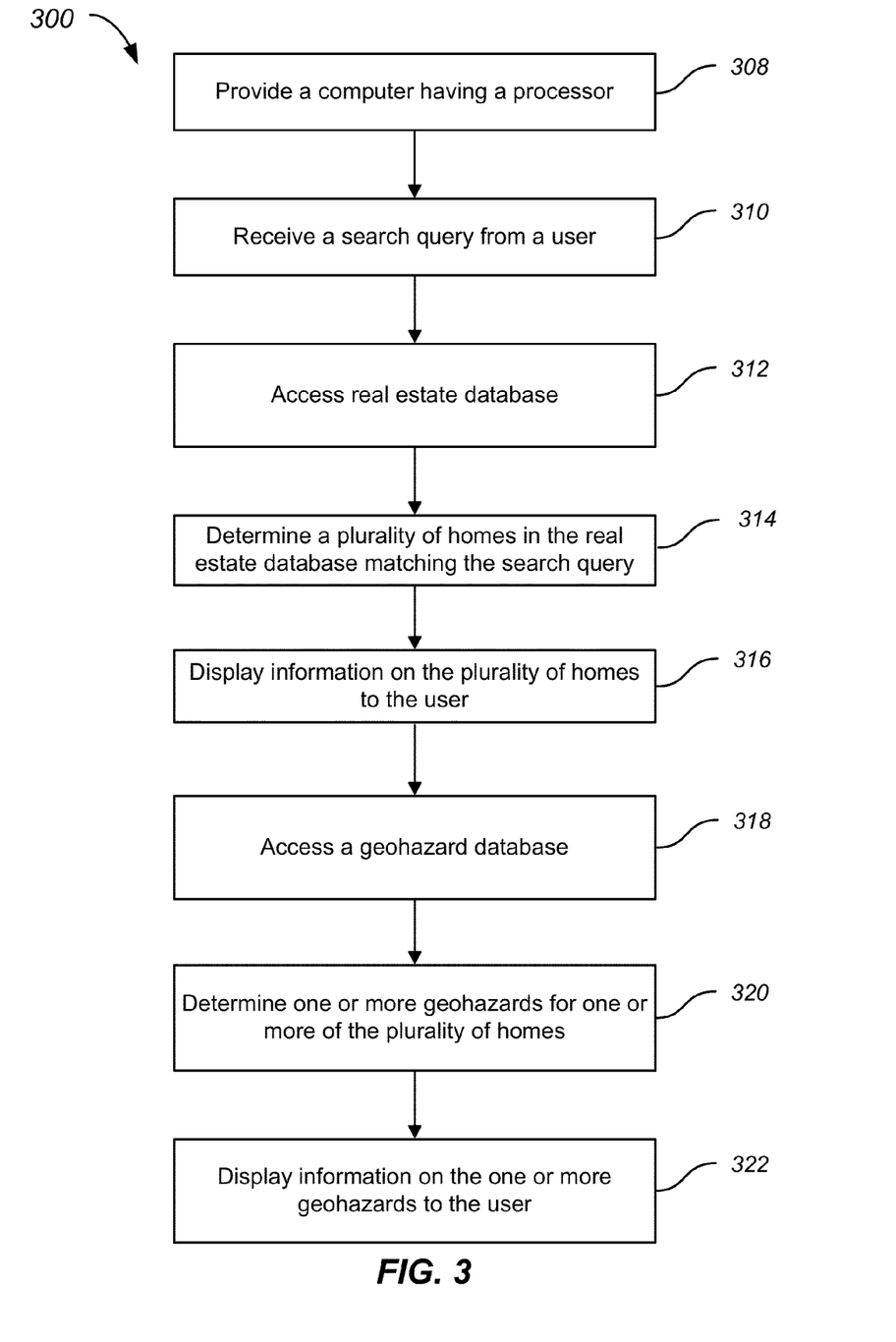
FIG. 3 is a high level flowchart illustrating a method of searching real estate listings and displaying geohazard information related to homes returned by the search according to an embodiment of the present invention.

FIG. 3 is a high level flowchart illustrating a method of searching real estate listings and displaying geohazard information related to homes returned by the search according to an embodiment of the present invention. The method 300 includes providing a computer having a processor (308) and receiving a search query from a user (310). In an embodiment of the present invention, the search query is input by the user using user input module 240 and the search query is received by the search engine 210 illustrated in FIG. 2. An individual interested in purchasing real estate can enter a number of different search parameters or criteria for searching by the search engine 210, such as price range, square footage, number of bedrooms, and the like. The search engine accesses the real estate database 220, which includes listings and details about property for sale in a particular location (312). For example, the real estate database 220 may be provided by a listing service such as those that provide basic real estate information specific to realty that is for sale in an area. Information in the real estate database 220 can include data about the property, such as the number of bedrooms, price range, or if there is a pool, for example. The real estate database 220 may also include information specific to a property, such as sales history, zoning parameters, or an estimated property value, for example. Additional description related to real estate databases is provided in commonly assigned and copending U.S. patent application Ser. No. 12/206,814, entitled "Systems and Methods for Providing a Real Estate and Rental Marketplace," filed on Sep. 9, 2008, the disclosure of which is hereby incorporated by reference in its entirety.

According to embodiments of the present invention, real estate data from one or more real estate databases (e.g., data from the Multiple Listing Service (MLS)) is stored for analysis and display to the user. By storing MLS or other real estate data over time, an analysis can be performed to determine changes in home price and features, providing insight into additions, remodeling due to damage, or the like. In addition to MLS data, data from other aggregated real estate listing networks is included within the scope of the present invention and the MLS is merely discussed as an example of the data that can be utilized by embodiments of the present invention.

In addition to cached real estate data, embodiments of the present invention can utilize real estate data available from a membership organization (e.g., the present assignee). For some homes, multiple members of the organization will have lived in the home. As members move in an out of homes in an area, data on the homes is available to the membership organization and is cached for use in embodiments of the present invention.

The search engine 210, in conjunction with the real estate database 220, determines and returns a search result including a plurality of properties matching the search query (314). Information on the plurality of homes is displayed to the user (316). In some embodiments, the user output module 242 is utilized to display the results to the user. Typically, the information is displayed using a web page and includes one or more photos of the home adjacent to the information related to the home. One of ordinary skill in the art would recognize many variations, modifications, and alternatives.

The method also include accessing a geohazard database (318) to determine one or more geohazards associated with one or more of the plurality of homes (320). In a specific embodiment, geohazard information is determined for all of the homes indicated by the user, whereas in other embodiments, for example the one illustrated in FIG. 3, geohazard information is only determined for particular homes returned by the search. The geohazard database can be accessed and information on geohazards determined based on the address of the home, the parcel number, or the like. The information on the one or more geohazards is displayed to the user (322). Typically, the geohazard information is displayed using the same output module 242 that is used to display the search results. Thus, in addition to the usual information on the homes returned in by the search, geohazard information is also displayed for the user.

In the embodiment illustrated in FIG. 3, a user searches for homes available in an area and a list of available homes is returned by a search engine (i.e., a real estate marketplace application). For one or more of the homes returned in the list, the addresses can be used as inputs to search the geohazard database in order to provide information on geohazards to the user. Thus, embodiments of the present invention provide functionality not available using conventional real estate search services by providing geohazard information not conventionally available to home purchasers. In another embodiment, rather than first determining a plurality of homes matching a search query, a user can directly enter an address used by the check insurability engine 250, which can use the address to determine one or more geohazards associated with the address of interest.

At the present time, determining the geohazards associated with an address can involve the use of charge-per-use databases or other processes that are expensive. Thus in some embodiments, presentation of geohazards data for an address is available as a premium service. Referring to FIG. 3, for initial search results returned when searching for homes, geohazards data may not be displayed, but when a person saves a home for future reference, this may trigger the geohazards analysis engine. In this example, the next time a person viewed the home, a notification could be provided that the geohazards have been analyzed and an insurability check has been performed that is now available to the user. As the cost of performing the geohazards analysis decreases, the implementation of the geohazard analysis process could be expanded as appropriate.

Although an embodiment of the present invention determines geohazard information on each of the homes returned by the search results, this is not required by the present invention. Because determining the geohazards applicable to a given property may involve a non-zero cost, the determination of the applicable geohazards may only be performed for a subset of the homes returned by the search. Additionally, since some homes may not have any geohazards associated with the home, no geohazard information will be returned. For these cases, an indication that the home is free from geohazards may be provided to the user in place of the geohazard information.

In some embodiments, the analysis of geohazards is performed upon request, whereas in other embodiments, it is performed on a real-time basis, running behind the scenes. In this embodiment, when a listing including an address of a home is returned, the insurability risk will be computed and information on the geohazards associated with the home will be provided to the user. Such information can include the premium difference associated with the geohazard or the fact that the property is not insurable as a result of the geohazard.

The geohazard data can be provided by external or internal sources. Typically, data from both external and internal sources is aggregated using a rules-based engine to provide information useful in determining the insurance impact of geohazards associated with a given property. As an example of both expert and community information used in determining the insurance impact of geohazards, news sources and other cloud sources can be utilized to supplement databases of geohazard information. As an example, if a neighborhood or an area of town experiences subsidence that is reported in the local news, archived new stories could be utilized in combination with other data sources to provide a long term view of this geohazard. Information on neighborhoods contained in blogs, newspapers, magazines, web sites, and the like can be utilized and aggregated to provide inputs to the check insurability engine.

According to an embodiment of the present invention, a sentiment analysis can be performed on new stories, community content, social media, and the like to build a comprehensive score around a home builder, local schools, the neighborhood, local crime, and the like. Thus, a comprehensive database including the combination of user information, media content, and expert information is provided. This information can be presented in a personalized user interface to provide additional in-depth information about the address of interest.

A person performing the method illustrated in FIG. 3 using the system illustrated in FIG. 2 could be provided with search results that include three homes in a given neighborhood. In addition to the real estate information usually provided in relation to the homes, embodiments of the present invention will provide the user with visibility into the geohazards data for one or more of the homes as well. Thus, for these three example homes, if two of the homes have a higher insurance premium due to their location being in a brush fire zone, this information may influence the user to purchase the third home for which the insurance premiums are lower. Without the availability of the geohazards data provided by embodiments of the present invention, the user is not able to determine the differences in insurance premiums between these three homes until much later in the purchase process if at all. Thus, it will be understood that determining one or more geohazards for each of the plurality of homes may be performed for less than the total number of homes returned in the search, since the plurality of home may be a subset of the total number of homes returned by the search.

Embodiments of the present invention include a variety of different data presentation modes. In one embodiment, a binary presentation of insurable/not insurable is provided based on the geohazards analysis. Another version of a binary presentation is that geohazards are associated with an address or not associated with an address. In other embodiments for which the property is insurable, an insurance cost index, for example, on a scale of 0 to 100 can be provided to provide the user with information on the impact of the geohazards on the address. In yet other embodiments, the actual premium difference is displayed to the user. One of ordinary skill in the art would recognize many variations, modifications, and alternatives.

In another embodiment, a geohazards tab is provided in association with the home listings resulting from the search. When a user selects the geohazards tab, information on the geohazards associated with the home, if any, are presented to the user. As an example, if the home is in a flood plain and the customer will need flood insurance, the price for the flood insurance policy can be computed and displayed to the user. If water damage claims have been made on the property, this information could be presented to the user, providing an indication that flooding damage is likely in the future.

Data on geohazards presented to the user can include a history of past insurance claims for the address of interest. In addition to displaying an insurance claims history for the home, information from city planning departments and the like can be displayed to provide a user with information on remodeling of the home, permits applied for on the home, permits granted on the home, and the like.

In addition to information on geohazards and insurance claim history being made available for an address of interest, embodiments of the present invention provide information on homes within a predetermined distance of the address of interest. As an example, if a home on the same street as the home at the address of interest had filed a water damage claim, this information could be presented to the user, since this can provide an indication that flooding problems may exist in the neighborhood.

As an example, in a wildfire prone area, fire risk data for homes is available on a per-home basis. Although an address of interest may not have a high fire risk, other homes in the neighborhood may have a high fire risk. In this example, a user interested in the home at the address of interest is presented with information on the fire risk of other nearby homes since such information may indicate that evacuations due to fire threat may be common in the neighborhood. Thus, although a particular home is not susceptible to a particular geohazard, the fact that other homes in the neighborhood are susceptible to a particular geohazard may be useful information for the potential homebuyer.

Utilizing embodiments of the present invention, a financial services company (e.g., a bank, an insurance company, a mortgage lender, and the like) is able to expose a customer to the geohazards associated with a particular property at an early stage in the home acquisition process. Thus, customer satisfaction is improved since expectations are set early, not with the customer finding out near the closing that the home is uninsurable or only insurable at a higher than expected cost. Thus, geohazards are a part of the decision criteria during the home selection phase of the home buying process.

It should be appreciated that the specific steps illustrated in FIG. 3 provide a particular method of method of searching real estate listings and displaying geohazard information related to homes returned by the search according to an embodiment of the present invention. Other sequences of steps may also be performed according to alternative embodiments. For example, alternative embodiments of the present invention may perform the steps outlined above in a different order. Moreover, the individual steps illustrated in FIG. 3 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 4:
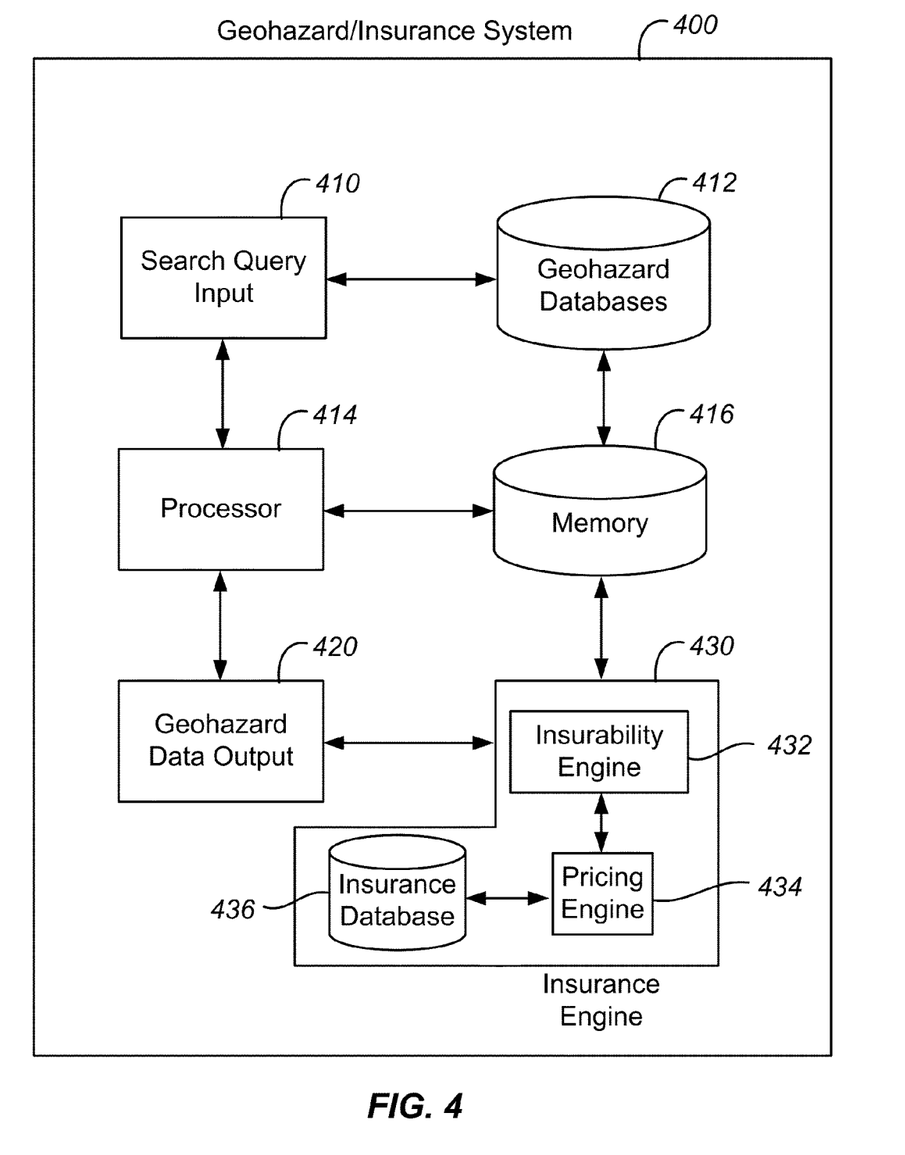
FIG. 4 is a high level schematic diagram illustrating a system for determining insurability based on geohazards according to an embodiment of the present invention.

FIG. 4 is a high level schematic diagram illustrating a system for determining insurability based on geohazards according to an embodiment of the present invention. The geohazard/insurance system 400 includes a processor 414 and a memory 416. The description provided in relation to processors and memory in FIG. 6 is also applicable to the processor 414 and memory 416. The processor interacts with the search query input 410 to receive queries from a user and to perform a check insurability function utilizing the geohazard databases 412. The geohazard databases may be proprietary to the insurance company operating the geohazard/insurance system 400, proprietary to a third party provider, publicly available, or combinations thereof. The geohazard databases may be a single database, multiple databases, local, or remote. Results from the check insurability function can be stored in memory 416 for future use in display to the customer using the geohazards data output 420 or by other means.

In an embodiment, a user enters an address of interest using the search query input 410 and the system checks the insurability using the geohazard databases 412. Information on the geohazards can be presented to the user using the geohazard data output 420. If the property associated with the address is in an area for which the geohazards pose a risk greater than a predetermined risk level, the insurance company may determine that the property is uninsurable and communicate this fact to the user through the geohazard data output 420. The process of determining that the property is uninsurable will utilize the insurability engine 432, which has access to the insurance database 436. If the property is insurable, then the insurance engine 430 will use the pricing engine 434 to compute the premium for the property. The premium can include a baseline premium and an additional premium based on the geohazards associated with the address. The insurance database 436 and the geohazard databases 412 can be combined into a single database in some embodiments. One of ordinary skill in the art would recognize many variations, modifications, and alternatives.

Figure 5:
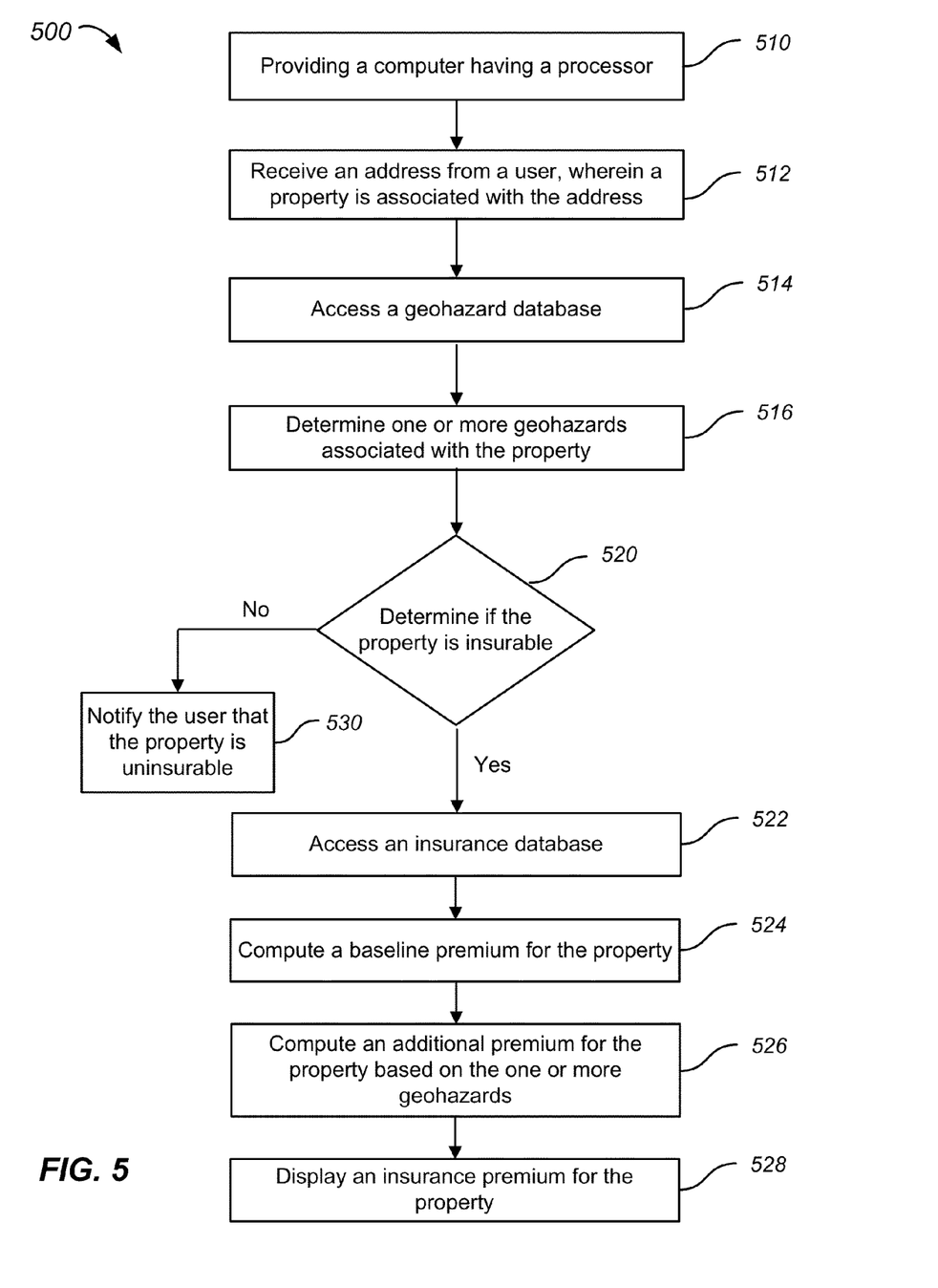
FIG. 5 is a high level flowchart illustrating a method of determining insurability based on geohazards and informing a user of the insurability status according to an embodiment of the present invention.

FIG. 5 is a high level flowchart illustrating a method of determining an insurability status based on geohazards and informing a user of the insurability status according to an embodiment of the present invention. The method 500 includes providing a computer having a processor (510). Typically, the computer is a computer provided and operated by an insurance company and is accessible to the user through the Internet. In another embodiment, the user interacts with an agent of the insurance company, who provides inputs to the computer through an appropriate interface. The method also includes receiving an address from the user (512). A property is associated with the address. As an example, a user may input the address using the search query input 410 illustrated in FIG. 4. The address may be submitted by the user and received by the computer through an Internet web page, for example, an Internet site operated by the insurance company.

The method further includes accessing, using the processor, a geohazard database (514). The geohazard database may be a proprietary geohazard database provided by the insurance company (e.g., the insurance company operating the geohazard/insurance system 400), a proprietary database maintained by a third party provider, a publicly available database, or a database compiling information from both publicly available sources and proprietary sources. One of ordinary skill in the art would recognize many variations, modifications, and alternatives. The method also includes determining, using the processor, one or more geohazards associated with the property (516). The processor 414 illustrated in FIG. 4 may be used to determine the one or more geohazards associated with the property. A determination is made, based on the geohazard data, of whether or not the property is insurable (520). For some properties, the presence of one or more geohazards, such as location in a flood plain, location in a brush fire zone, or any of the other geohazards discussed herein, may present a high enough risk to the insurance company that the company will not insure the given property. If the property is not insurable based on the geohazards, then the user is notified that the property is uninsurable (530). Thus, embodiments of the present invention provide a "Check Insurability" functionality not provided by conventional systems. The user may be notified that the property is uninsurable the Internet web page for example, through an Internet site operated by the insurance company.

If the property is insurable, then the processor is used to access an insurance database (522), such as insurance database 436 illustrated in FIG. 4. Typically, the insurance database is provided by an insurance company, for example, the insurance company operating the geohazard/insurance system 400. The processor 414 can be utilized to access the insurance database or a processor in the insurability engine 432 can be utilized. It will be evident to one of skill in the art that the various functions performed by the processors described herein can be performed by a single processor, multiple processors, or combinations thereof. In some embodiments, the processing of information in insurance databases and geohazard databases may be carried out using dedicated hardware such as an application specific integrated circuit (ASIC). In yet other embodiments, the processing may be carried out using a combination of software and hardware. As an example, such processors include dedicated circuitry, ASICs, combinatorial logic, other programmable processors, combinations thereof, and the like. Thus, processors as provided herein are defined broadly and include processors adapted to receive and process queries, search databases, determine insurability and pricing of policies, store and output results, perform communications functions, and the other functionality described herein.

A baseline premium is computed for the property (524). The baseline premium, which can be considered as a premium independent of the one or more geohazards, is typically calculated using the pricing engine 434 as illustrated in FIG. 4. Processor 414 can be utilized in pricing the policy at the baseline level or a processor in the pricing engine can be utilized. An additional premium is computed based on the one or more geohazards (526). In some embodiments, the computation of the baseline premium and the additional premium based on the one or more geohazards is combined into a single computation. One of ordinary skill in the art would recognize many variations, modifications, and alternatives. The insurance premium for the property is displayed (528). The insurance premium includes the baseline premium and the additional premium based on the one or more geohazards. Thus, embodiments of the present invention provide a customer with a quote for the insurance premium that is tailored to the particular property of interest, including the geohazards associated with the property. Utilizing embodiments of the present invention, a customer is able to determine if a property is insurable and, if it is insurable, get a quote on the insurance including any additional premiums based on geohazards.

It should be appreciated that the specific steps illustrated in FIG. 5 provide a particular method of determining an insurability status based on geohazards and informing a user of the insurability status according to an embodiment of the present invention. Other sequences of steps may also be performed according to alternative embodiments. For example, alternative embodiments of the present invention may perform the steps outlined above in a different order. Moreover, the individual steps illustrated in FIG. 5 may include multiple substeps that may be performed in various sequences as appropriate to the individual step. Furthermore, additional steps may be added or removed depending on the particular applications. One of ordinary skill in the art would recognize many variations, modifications, and alternatives.

Although, in the embodiment illustrated in FIG. 5, the address is received from a user, this is not required by the present invention. Referring to FIG. 3, the address could be produced as part of the search results and then used in performing the method described in relation to FIG. 5. Utilizing an address from the search results, the process of checking insurability and quoting an insurance premium for a policy as illustrated in FIG. 5 could be performed. Thus, the steps described in FIGS. 3 and 5 can be combined to not only display geohazard data, but to quote insurance policies in light of any geohazards associated with the property.

FIG. 6 shows a block diagram of a computer including instructions to perform any one or more of the methodologies described herein. A system 600 includes a computer 610 connected to a network 130. The computer 610 includes a processor 620 (also referred to as a data processor), a storage device 622, an output device 624, an input device 626, and a network interface device 628, all connected via a bus 630. The processor 620 represents a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. The processor 620 executes instructions and includes that portion of the computer 610 that controls the operation of the entire computer. Although not depicted in FIG. 6, the processor 620 typically includes a control unit that organizes data and program storage in memory and transfers data and other information between the various parts of the computer 610. The processor 620 receives input data from the input device 626 and the network 130 reads and stores code and data in the storage device 622 and presents data to the output device 624.

Although the computer 610 is shown to contain only a single processor 620 and a single bus 630, the disclosed embodiment applies equally to computers that may have multiple processors and to computers that may have multiple busses with some or all performing different functions in different ways.

The storage device 622 represents one or more mechanisms for storing data. For example, the storage device 622 may include read-only memory (ROM), random access memory (RAM), magnetic disk storage media, optical storage media, flash memory devices, and/or other machine-readable media. In other embodiments, any appropriate type of storage device may be used. Although only one storage device 622 is shown, multiple storage devices and multiple types of storage devices may be present. Further, although the computer 610 is drawn to contain the storage device 622, it may be distributed across other computers, for example on a server.

The storage device 622 includes a controller (not shown in FIG. 6) and data items 634. The controller includes instructions capable of being executed on the processor 620 to carry out the methods described more fully throughout the present specification. In another embodiment, some or all of the functions are carried out via hardware in lieu of a processor-based system. In one embodiment, the controller is a web browser, but in other embodiments the controller may be a database system, a file system, an electronic mail system, a media manager, an image manager, or may include any other functions capable of accessing data items. Of course, the storage device 622 may also contain additional software and data (not shown), which is not necessary to understand the invention.

Although the controller and the data items 634 are shown to be within the storage device 622 in the computer 610, some or all of them may be distributed across other systems, for example on a server and accessed via the network 130.

The output device 624 is that part of the computer 610 that displays output to the user. The output device 624 may be a liquid crystal display (LCD) well-known in the art of computer hardware. But, in other embodiments the output device 624 may be replaced with a gas or plasma-based flat-panel display or a traditional cathode-ray tube (CRT) display. In still other embodiments, any appropriate display device may be used. Although only one output device 624 is shown, in other embodiments any number of output devices of different types, or of the same type, may be present. In an embodiment, the output device 624 displays a user interface.

The input device 626 may be a keyboard, mouse or other pointing device, trackball, touchpad, touch screen, keypad, microphone, voice recognition device, or any other appropriate mechanism for the user to input data to the computer 610 and manipulate the user interface previously discussed. Although only one input device 626 is shown, in another embodiment any number and type of input devices may be present.

The network interface device 628 provides connectivity from the computer 610 to the network 130 through any suitable communications protocol. The network interface device 628 sends and receives data items from the network 130.

The bus 630 may represent one or more busses, e.g., USB (Universal Serial Bus), PCI, ISA (Industry Standard Architecture), X-Bus, EISA (Extended Industry Standard Architecture), or any other appropriate bus and/or bridge (also called a bus controller).

The computer 610 may be implemented using any suitable hardware and/or software, such as a personal computer or other electronic computing device. Portable computers, laptop or notebook computers, PDAs (Personal Digital Assistants), pocket computers, appliances, telephones, and mainframe computers are examples of other possible configurations of the computer 610. For example, other peripheral devices such as audio adapters or chip programming devices, such as EPROM (Erasable Programmable Read-Only Memory) programming devices may be used in addition to, or in place of, the hardware already depicted.

The network 130 may be any suitable network and may support any appropriate protocol suitable for communication to the computer 610. In an embodiment, the network 130 may support wireless communications. In another embodiment, the network 130 may support hard-wired communications, such as a telephone line or cable. In another embodiment, the network 130 may support the Ethernet IEEE (Institute of Electrical and Electronics Engineers) 802.3x specification. In another embodiment, the network 130 may be the Internet and may support IP (Internet Protocol). In another embodiment, the network 130 may be a local area network (LAN) or a wide area network (WAN). In another embodiment, the network 130 may be a hotspot service provider network. In another embodiment, the network 130 may be an intranet. In another embodiment, the network 130 may be a GPRS (General Packet Radio Service) network. In another embodiment, the network 130 may be any appropriate cellular data network or cell-based radio network technology. In another embodiment, the network 130 may be an IEEE 802.11 wireless network. In still another embodiment, the network 130 may be any suitable network or combination of networks. Although one network 130 is shown, in other embodiments any number of networks (of the same or different types) may be present.

A user computer 150 can interact with computer 610 through network 130. The user computer 150 includes a processor 152, a storage device 154, and an input/output device 156. Referring to FIG. 1, the I/O device 156 can include the I/O Module 156 and the User Interface 158. The description related to processor 620 and storage device 622 is applicable to processor 152 and storage device 154. As an example, the user computer 150 can be a personal computer, laptop computer, or the like, operated by a member of a membership organization (e.g., the present assignee). Using the user computer 150, the member can then interact with computer 610 operated by the present assignee through network 130 in order to access the present assignee's web pages or the like.

The embodiments described herein may be implemented in an operating environment comprising software installed on any programmable device, in hardware, or in a combination of software and hardware. Although embodiments have been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

According to other embodiments of the present invention, methods and systems are provided to compute an insurability rating for a property. Embodiments of the present invention provide for information about geohazards to be presented to an representative of an insurance company in associate with the preparation of a quote on a particular property. As an example, when a prospective purchaser of insurance is communicating with an agent, information related to the geohazards for a property may be communicated to the agent, who can, in turn, communicate such information to the prospective purchaser. Thus, in addition to providing geohazard information as part of home search results, embodiments of the present invention can provide geohazard information during a process associated with the quoting or purchasing of insurance on the property.

Figure 7:
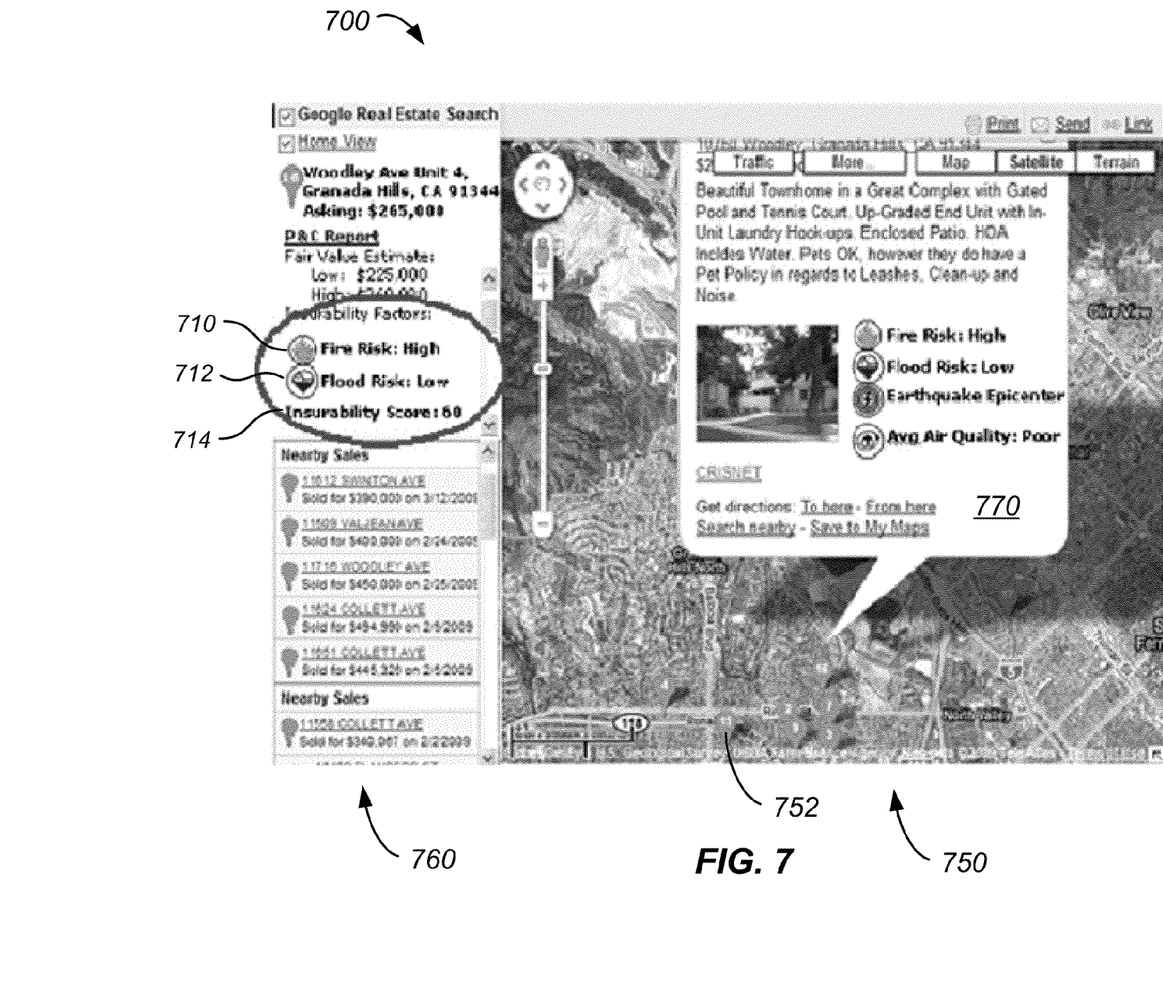
FIG. 7 is a high level schematic diagram illustrating a graphical user interface for displaying geohazard information according to an embodiment of the present invention.

FIG. 7 is a high level schematic diagram illustrating a graphical user interface for displaying geohazard information according to an embodiment of the present invention. As illustrated in FIG. 7, search results from a real estate search are presented along with a map with markers (e.g., push pins) indicating the locations of the various properties returned by the search. The graphical user interface illustrated in FIG. 7 can also be referred to as a map-based home search interface. Clicking on a marker will display information about the home in a predetermined format that may provide a photograph of the home as well as property information, structural information, owner comments, an Insurability Score described more fully below, and the like. Mapping can include a reference to one or more boundaries, polygons, or the like as appropriate to the particular application, for example, delineating a neighborhood, a school district, a city, a county, or the like.

For a particular home that is selected from the search results, an icon 710 or other visual indication is provided that can communicate the risk of various geohazards associated with the property. In the embodiment illustrated in FIG. 7, the icon 710 is accompanied by a description or explanation of the geohazard (i.e., Fire Risk) and a rating of the geohazard (i.e., High). The rating can be a numerical rating tied to a scale (e.g., 7 out of 10), a quantized rating (e.g., low/medium/high), or the like. In the embodiment illustrated in FIG. 7, a quantized rating of High is assigned to the selected property. In addition to icon 710, an additional icon 712 is provided in association with another geohazard (i.e., Flood Risk). Similar to the icon 710, additional icon 712 is accompanied by a description and a rating. The information related to geohazards can be displayed as an overlay on the map of the search area as illustrated in FIG. 7, in conjunction with information listed about the property as also illustrated, or the like. Embodiments of the present invention are not limited to the display of two icons and other icons can be displayed along with appropriate descriptions and/or ratings.

The graphical user interface also provides an Insurability Score 714 that provides the user with an indication of the impact the geohazards associated with the property are going to have on the price/availability of property insurance. As an example, increases in the value of the Insurability Score can indicate increases in insurance premium. The Insurability Score 714 can be based, in part, on information related to the geohazards as well as other information appropriate for underwriting considerations, including distance to the nearest fire hydrant, and the like. The Insurability Score 714 depicted as an icon in the illustrated embodiment provides potential rate differential factors to the prospective purchaser prior to purchase. Such prior to purchase disclosure allows the customer to make informed decisions to avoid financial hardships incurred from unknown rate incremental factors. Potential factors that may affect the insurance premium include, but are not limited to: Environmental factors such as, air quality and population density; Structural factors including exterior facade and roof composition; Emergency Infrastructure such as distance from fire stations, city or municipal water system, average EMS response time or the police-to-population ratio; Location-based factors such as the distance to a hospital or the crime rate of the neighborhood; Geoscape anomalies like flood plains, earthquake epicenters, frequent fire locations such as brush areas or the wildlife-urban-interface, and trajectories of hurricanes and tornado's (e.g., a tornado alley), and the like.

The Insurability Score 714 can be presented in a number of manners, for example, a quantized score (e.g., High, Medium, Low), a numerical value (75 out of 100, with 100 indicating no impact from geohazards), or the like. Thus, embodiments of the present invention provide both binary outputs (insurable/not insurable) and ranges for the insurability. Additionally, embodiments of the present invention provide for overlay of an insurability map onto a physical map. As an example, a map of a neighborhood could be overlaid with color coding to indicate the insurability risk of portions of the neighborhood. If the neighborhood abuts a wildfire area, then homes adjacent the wildfire area could be color coded (e.g., red) to indicate a higher insurability risk while homes more distant from the wildfire area could be color coded (e.g., green) to indicate low insurability risk. One of ordinary skill in the art would recognize many variations, modifications, and alternatives. These embodiments provide a user with geohazard information, not just on a particular home, but in an area including multiple homes. Thus, embodiments of the present invention provide geohazard information, either in relation to a single home as illustrated in FIG. 7 or in the context of a map of an area with geohazard information displayed for portions of the area.

Embodiments of the present invention are suitable for implementation through a variety of real estate related web portals. As an example, search results returned by a search performed using www.realtor.com, www.realestate.com, maps.google.com, and the like can be supplemented with geohazard information as described throughout this specification. By supplementing conventional search results with geohazards information, a user is presented with useful information that can protect the user from potential loss in an accessible format. The particular real estate search engine can pull geohazards information from public geohazard database(s), private geohazard database(s), or combinations thereof. In some embodiments, the geohazards data will be displayed for less than the complete listing of properties returned by the real estate search engine.

An insured person whose home is proximal to one or more geohazards may expect to have a higher insurance premium than the owner of a home far from such geohazards. For an integrated financial services provider, risk management is applied across the gamut of services so that the customer's financial security is not compromised by a penalty levied by one service. Embodiments of the present invention provide a graphical user interface operable to display a property and casualty insurability map. In an exemplary embodiment, a browser-based map program provides the customer with sales information on houses in an area, an electronic appraisal, and details of factors influencing insurance policies for one or more of the houses.

Referring once again to FIG. 7, the graphical user interface 700 is operable to display real estate information in conjunction with geohazards information. The graphical user interface 700 includes a map region 750 operable to display a map of a geographic area and a plurality of markers 752 disposed on the map. Each of the markers 752 is associated with a home for sale. The graphical user interface 700 also includes a home detail region 760 adjacent to the map region 750. The home detail region 760 is used to display first information related to a home selected from among the homes for sale. The first information can includes first marketing information related to the selected home and first geohazard information related to the selected home. The marketing information can include real estate information such as the price, estimated values, number of bedrooms, address, and the like. The geohazard information can include information related to one or more geohazards and can be presented in the form of icons, descriptions, ratings, and the like.

The graphical user interface 700 further includes a home summary region 770 overlaid on the map region 750. The home summary region 700 is used to display second information related to the selected home. The second information includes second marketing information and second geohazard information related to the selected home. The second marketing information can be different from or the same as the first marketing information and the second geohazard information can be different from or the same as the first geohazard information. In the illustrated embodiment, the first geohazard information includes an insurability score for the selected home and the second geohazard information includes information on additional geohazards associated with the selected home in the form of earthquake information and air quality information. At least one of the home detail region 760 or the home summary region 770 are used to display geohazard information related to the selected home. The first geohazard information or the second geohazard information can include an icon and a description related to a particular geohazard.

Figure 8:
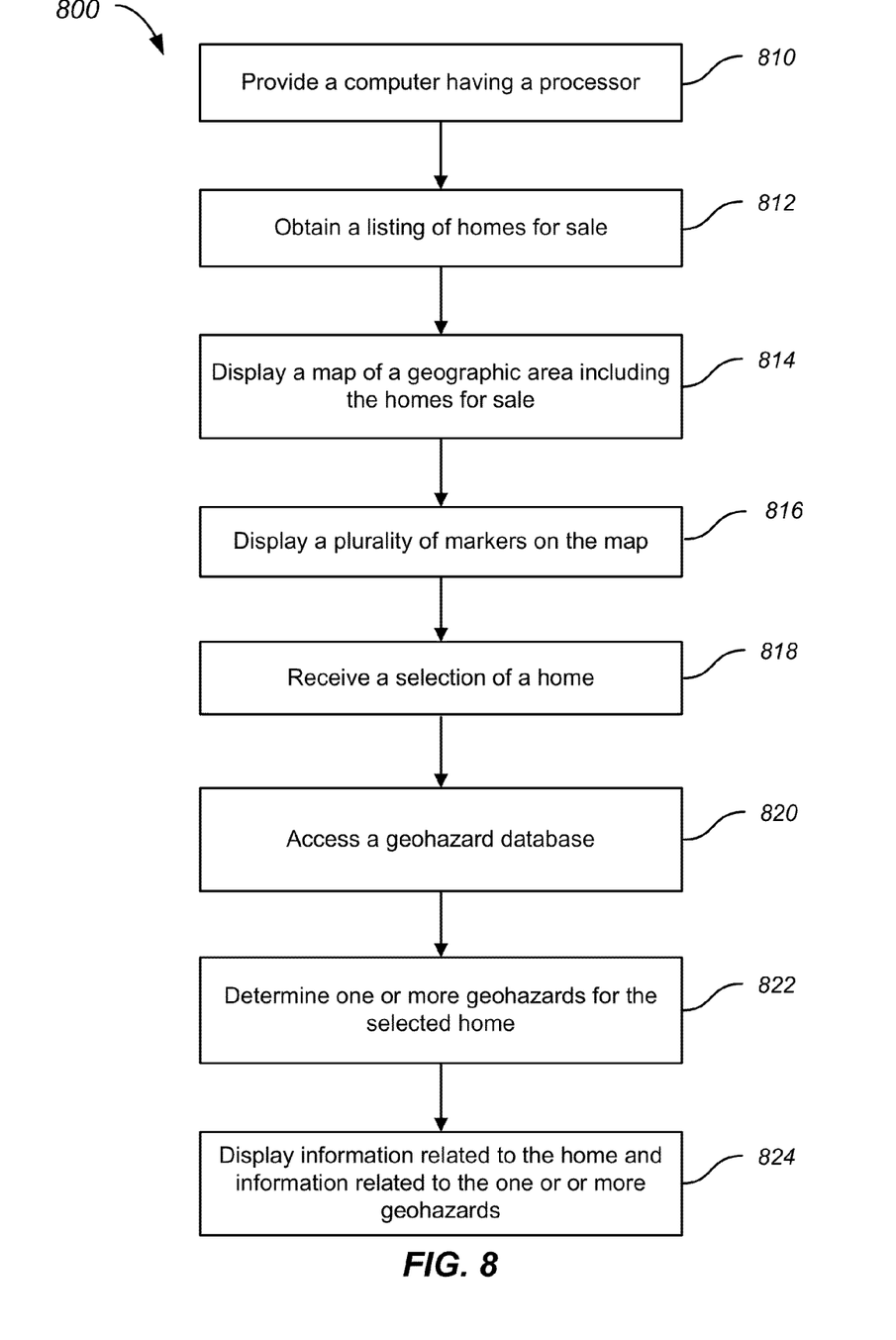
FIG. 8 is a high level flowchart illustrating a method of displaying real estate and geohazard information according to an embodiment of the present invention.

FIG. 8 is a high level flowchart illustrating a method of displaying real estate and geohazard information according to an embodiment of the present invention. The method 800 includes providing a computer having a processor (810) and obtaining a listing of homes for sale (812). The listing of homes for sale may be provided by a third party or result from a search conducted by a user. As an example, obtaining a listing of homes for sale may include receiving a search query from a user, accessing, using the processor, a real estate database including information related to homes, and determining, using the processor, the listing of homes for sale based on a comparison between the information related to the homes and the search query. In other embodiments, the geohazard information can be provided to a third party independent of the geohazard information.

The method also includes displaying a map of a geographic area including the homes for sale (814) and displaying a plurality of markers on the map (816). Each of the plurality of markers is associated with one of the homes for sale. The method further includes receiving a selection of a home from among the homes for sale (818), accessing, using the processor, a geohazards database (820) (e.g., a proprietary geohazards database), determining, using the processor, one or more geohazards for the selected home (822), and displaying information related to the selected home and information related to the one or more geohazards for the selected home (824). Information related to the one or more geohazards can include an icon representing a geohazard and a description of the geohazard.

In some embodiments, an insurability score is computed for the selected home and the insurability score is displayed to a user. The insurability score can be a numeric value associated with a range of numeric values, a binary indicator (insurable/uninsurable), or the like.

It should be appreciated that the specific steps illustrated in FIG. 8 provide a particular method of method of displaying real estate and geohazard information according to an embodiment of the present invention. Other sequences of steps may also be performed according to alternative embodiments. For example, alternative embodiments of the present invention may perform the steps outlined above in a different order. Moreover, the individual steps illustrated in FIG. 8 may include multiple sub-steps that may be performed in various sequences as appropriate to the individual step. Furthermore, additional steps may be added or removed depending on the particular applications. One of ordinary skill in the art would recognize many variations, modifications, and alternatives.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method of displaying geohazard information to a user, the method including:
   providing a computer having a processor;
   receiving a search query from the user;
   accessing, using the processor, a real estate database;
   determining, using the processor, a plurality of homes in the real estate database matching the search query;
   displaying information related to the plurality of homes to the user;
   accessing, using the processor, a geohazard database;
   determining, using the processor, one or more geohazards for one or more of the plurality of homes; and
   displaying information related to the one or more geohazards to the user.

2. The method of claim 1 wherein receiving the search query from the user comprises receiving the search query through a network.

3. The method of claim 2 wherein the search query is received through an Internet web page and displaying information related to the plurality of homes to the user comprises displaying information through the Internet web page.

4. The method of claim 3 wherein displaying information related to the one or more geohazards comprises displaying information through the Internet web page.

5. The method of claim 1 wherein the real estate database comprises MLS information.

6. The method of claim 1 wherein the geohazard database comprises a proprietary geohazard database.

7. The method of claim 1 wherein the one or more geohazards comprise at least one of location in a flood plain, location in a brush fire zone, location in an area susceptible to a sinkhole, or location in a tornado alley.

8. The method claim 1, further comprising:
   computing, using the processor, an insurance risk associated with each of the plurality of homes using the information related to the one or more geohazards for the one or more of the plurality of homes; and
   displaying information related to the insurance risk associated with each of the plurality of homes.

9. The method of claim 8 wherein the information related to the insurance risk includes an additional insurance premium associated with the determined one or more geohazards applicable to each of the one or more of the plurality of homes.

10. A method of informing a user of an insurability status based on geohazards, the method comprising:
   providing a computer having a processor;
   receiving an address from the user, wherein a property is associated with the address;
   accessing a geohazard database;
   determining, using the processor, one or more geohazards associated with the property;
   determining, using the processor, if the property is insurable;
   if the property is insurable:
      accessing an insurance database;
      computing, using the processor, a baseline insurance premium for the property;
      computing, using the processor, an additional insurance premium based on the one or more geohazards; and
      displaying an insurance premium for the property, wherein the insurance premium includes the baseline insurance premium and the additional insurance premium; and
   if the property is uninsurable, notifying the user that the property is uninsurable.

11. The method of claim 10 wherein receiving the address from the user comprises receiving the address through a network.

12. The method of claim 11 wherein notifying the user that the property is uninsurable comprises notifying the user through an Internet web page.

13. The method of claim 10 wherein the computer and the geohazards database is provided by an insurance company.

14. The method of claim 13 wherein the insurance database is provided by the insurance company.

15. The method of claim 10 wherein the geohazard database comprises a proprietary geohazard database.

16. The method of claim 10 wherein the one or more geohazards comprise at least one of location in a flood plain or location in a brush fire zone.

17. A non-transitory computer-readable storage medium comprising a plurality of computer-readable instructions tangibly embodied on the computer-readable storage medium, which, when executed by a data processor, display geohazard information to a user, the plurality of instructions comprising:
   instructions that cause the data processor to receive a search query from the user;
   instructions that cause the data processor to access a real estate database;
   instructions that cause the data processor to determine a plurality of homes in the real estate database matching the search query;
   instructions that cause the data processor to display information related to the plurality of homes to the user;
   instructions that cause the data processor to access a geohazard database;
   instructions that cause the data processor to determine one or more geohazards for each of the plurality of homes; and
   instructions that cause the data processor to display information related to the one or more geohazards to the user.

18. The computer-readable storage medium of claim 17 wherein the search query comprises a search query received through a network.

19. The computer-readable storage medium of claim 18 wherein the information related to the plurality of homes is displayed through an Internet web page.

20. The computer-readable storage medium of claim 19 wherein the information related to the one or more geohazards is displayed through the Internet web page adjacent to the information related to the plurality of homes.

\* \* \* \* \*